(12) United States Patent
de Carvalho et al.

(10) Patent No.: US 11,716,918 B2
(45) Date of Patent: Aug. 8, 2023

(54) SYSTEM FOR ADJUSTING THE LATERAL POSITIONING OF A WHEEL ASSEMBLY OF AN AGRICULTURAL IMPLEMENT

(71) Applicant: CNH Industrial America LLC, New Holland, PA (US)

(72) Inventors: João Augusto Bello de Carvalho, Piracicaba (BR); Monte Lee DeKam, Westmont, IL (US); Arun Santosh Seetamsetti, Willowbrook, IL (US); Austin Joseph McLuckie, Morris, IL (US)

(73) Assignee: CNH Industrial America LLC, New Holland, PA (US)

( * ) Notice: Subject to any disclaimer, the term of this patent is extended or adjusted under 35 U.S.C. 154(b) by 211 days.

(21) Appl. No.: 17/355,671

(22) Filed: Jun. 23, 2021

(65) Prior Publication Data

US 2021/0400861 A1 Dec. 30, 2021

Related U.S. Application Data

(60) Provisional application No. 63/046,112, filed on Jun. 30, 2020.

(51) Int. Cl.
*A01B 63/00* (2006.01)
(52) U.S. Cl.
CPC .................................. *A01B 63/006* (2013.01)

(58) Field of Classification Search
CPC ... A01B 63/006; A01B 63/163; A01B 63/245; A01B 71/02
USPC .......................................................... 172/507
See application file for complete search history.

(56) References Cited

U.S. PATENT DOCUMENTS

| | | | | |
|---|---|---|---|---|
| 5,054,561 A | * | 10/1991 | Bussiere | A01B 29/046 172/674 |
| 6,247,717 B1 | * | 6/2001 | Lovins | A61G 5/10 280/250.1 |
| 6,997,121 B2 | * | 2/2006 | Buchholtz | A01B 49/06 172/699 |
| 2021/0274699 A1 | * | 9/2021 | Patwardhan | A01B 63/163 |

* cited by examiner

*Primary Examiner* — Gary S Hartmann
(74) *Attorney, Agent, or Firm* — Rebecca Henkel; Rickard Demille

(57) ABSTRACT

A system for adjusting the lateral positioning of wheel assemblies of agricultural implements includes a toolbar extending in a lateral direction and having a substantially circular cross-sectional shape. The system also includes a rail coupled to the toolbar and extending in the lateral direction along a length of the toolbar. Additionally, the system includes a wheel assembly configured to be removably coupled to the toolbar such that the rail is positioned between the toolbar and a portion of the wheel assembly. The wheel assembly includes engagement structure configured to engage the rail when the wheel assembly is installed relative to the toolbar, with the engagement between the rail and the engagement structure being configured to prevent rotation of the wheel assembly about the toolbar.

20 Claims, 7 Drawing Sheets

SYSTEM FOR ADJUSTING THE LATERAL POSITIONING OF A WHEEL ASSEMBLY OF AN AGRICULTURAL IMPLEMENT

CROSS-REFERENCE TO RELATED APPLICATIONS

The present application is based upon and claims the right of priority to U.S. Provisional Patent Application No. 63/046,112, filed Jun. 30, 2020, the disclosure of which is hereby incorporated by reference herein in its entirety for all purposes.

FIELD OF THE INVENTION

The present subject matter relates generally to agricultural implements, and, more particularly, to a system for adjusting the lateral positioning of a wheel assembly of an agricultural implement, such as a wing wheel assembly for a multi-wing agricultural implement, as well as related wheel assemblies and agricultural implements.

BACKGROUND OF THE INVENTION

A wide range of farm implements have been developed and are presently in use for tilling, planting, harvesting, and so forth. Planters, for example, are commonly towed behind tractors and may cover wide swaths of ground for planting. To make agricultural operations as efficient as possible, wide swaths of ground may be covered by extending wing assemblies along either side of the implement being pulled by the tractor. Typically, the wing assemblies include one or more toolbars, various ground engaging tools mounted on the toolbar(s), and one or more associated support wheels. For instance, with multi-wing planters, a plurality of laterally spaced row units may be supported by the toolbar extending laterally across each wing assembly of the implement.

In many instances, it is desirable to adjust the lateral spacing defined between adjacent row units of a planter based on, for example, the type of crop being planted. For instance, different row unit spacing may be desirable when planting corn versus planting soybeans. Moreover, operators in different regions often use different row unit spacings to best suit their needs in view of environmental conditions and/or desired planting configurations. However, with conventional multi-wing planters, the support wheel positioned on each wing assembly often limits the range of row unit spacings that can be achieved on the planter. Specifically, the frame of the support wheel is typically welded to the toolbar, thereby fixing the position of the support wheel relative to the toolbar. This fixed wheel position can often prevent an operator from setting up his/her machine to achieve the desired row unit spacing for a given planting operation.

Accordingly, an improved wheel assembly and related systems that allow for the position of the wheel to be adjusted along the length of the toolbar would be welcomed in the technology.

BRIEF DESCRIPTION OF THE INVENTION

Aspects and advantages of the invention will be set forth in part in the following description, or may be obvious from the description, or may be learned through practice of the invention.

In one aspect the present subject matter is directed to a system for adjusting the lateral positioning of wheel assemblies of agricultural implements. The system includes a toolbar extending in a lateral direction and having a substantially circular cross-sectional shape. The system also includes a rail coupled to the toolbar and extending in the lateral direction along a length of the toolbar. Additionally, the system includes a wheel assembly configured to be removably coupled to the toolbar such that the rail is positioned between the toolbar and a portion of the wheel assembly. The wheel assembly includes engagement structure configured to engage the rail when the wheel assembly is installed relative to the toolbar, with the engagement between the rail and the engagement structure being configured to prevent rotation of the wheel assembly relative to the toolbar.

In another aspect, the present subject matter is directed to a multi-wing agricultural implement. The implement includes a frame assembly comprising a plurality of laterally extending toolbars, with the laterally extending toolbars comprising a central toolbar, a first wing toolbar positioned on one side of the central toolbar along a lateral direction of the frame assembly and a second wing toolbar positioned on the opposed side of the central toolbar along the lateral direction, with the first wing toolbar defining a substantially circular cross-sectional shape. The implement also includes a rail coupled to the first wing toolbar and extending in the lateral direction along a length of the first wing toolbar. In addition, the implement includes a wheel assembly configured to be removably coupled to the first wing toolbar such that the rail is positioned between the first wing toolbar and a portion of the wheel assembly. The wheel assembly includes engagement structure configured to engage the rail when the wheel assembly is installed relative to the first wing toolbar, with the engagement between the rail and the engagement structure being configured to prevent rotation of the wheel assembly relative to the first wing toolbar.

These and other features, aspects and advantages of the present invention will become better understood with reference to the following description and appended claims. The accompanying drawings, which are incorporated in and constitute a part of this specification, illustrate embodiments of the invention and, together with the description, serve to explain the principles of the invention.

BRIEF DESCRIPTION OF THE DRAWINGS

A full and enabling disclosure of the present invention, including the best mode thereof, directed to one of ordinary skill in the art, is set forth in the specification, which makes reference to the appended figures, in which.

DETAILED DESCRIPTION OF THE INVENTION

Figure 1:
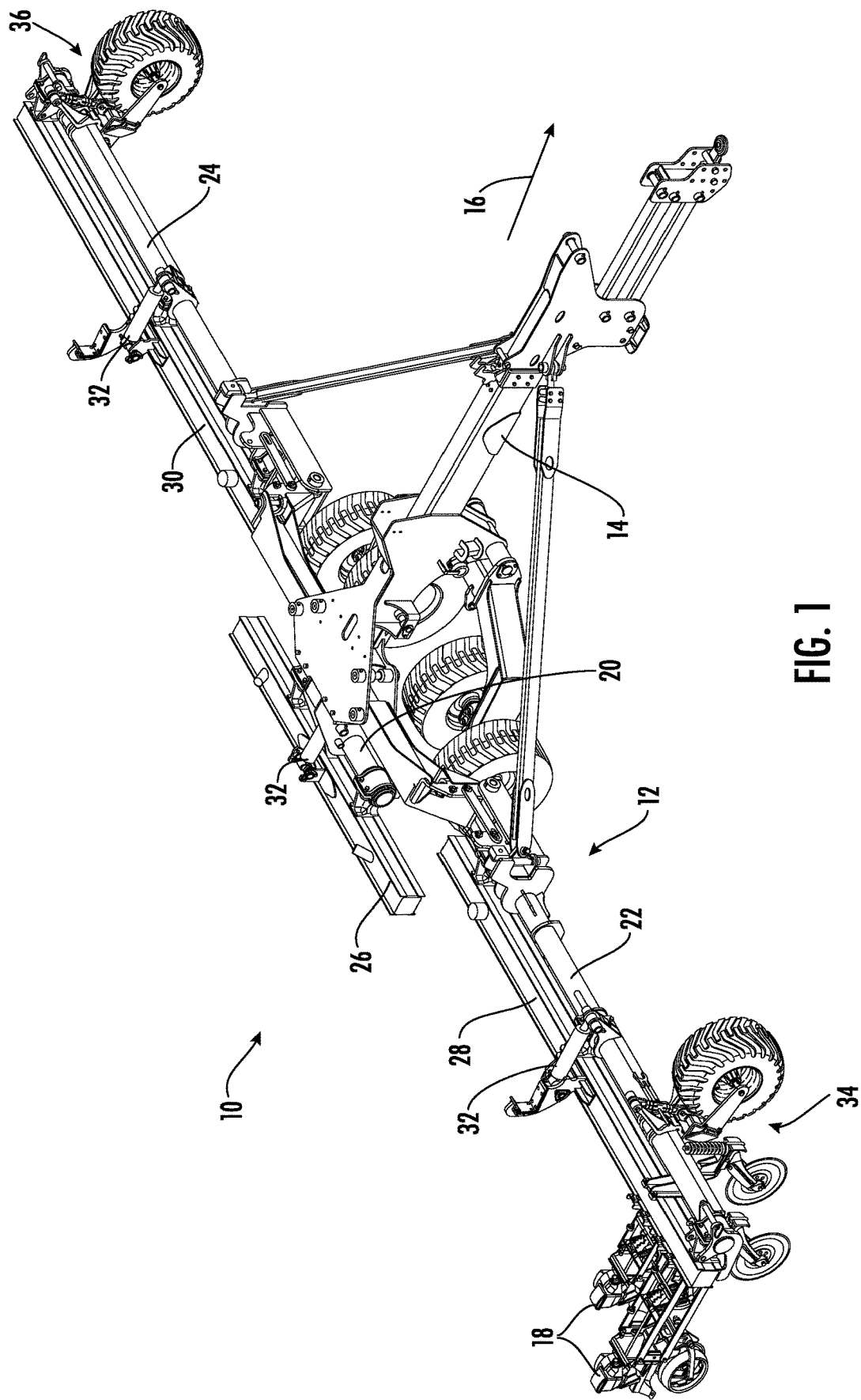
FIG. 1 illustrates a perspective view of one embodiment of a multi-wing agricultural implement in accordance with aspects of the present subject matter.

Reference now will be made in detail to embodiments of the invention, one or more examples of which are illustrated in the drawings. Each example is provided by way of explanation of the invention, not limitation of the invention. In fact, it will be apparent to those skilled in the art that various modifications and variations can be made in the present invention without departing from the scope or spirit of the invention. For instance, features illustrated or described as part of one embodiment can be used with another embodiment to yield a still further embodiment. Thus, it is intended that the present invention covers such modifications and variations as come within the scope of the appended claims and their equivalents.

In general, the present subject matter is directed to a system for adjusting the lateral positioning of a wheel assembly of an agricultural implement, such as a wing wheel assembly for a multi-wing agricultural implement, as well as related wheel assemblies and agricultural implements. Specifically, in several embodiments, the system may include a toolbar and at least one wheel assembly configured to be coupled to the toolbar in a manner that allows the wheel assembly to be slid or moved laterally along a length of the toolbar to adjust the lateral positioning of the wheel assembly relative to the toolbar. For instance, in one embodiment, the wheel assembly may be configured to be removably coupled to the toolbar via mechanical fasteners (and related hardware) that, when loosened, permit the wheel assembly to be quickly and easily moved or slid along the length of the toolbar.

Additionally, in several embodiments, the toolbar includes or defines a substantially circular-shaped cross-sectional profile. In such embodiments, the system may also include an anti-rotation feature that prevents rotation or circumferential slipping or spinning of the wheel assembly relative to the toolbar. For instance, the disclosed system may include a laterally extending slide rail coupled to the toolbar such that the slide rail is positioned between the wheel assembly and the toolbar when the wheel assembly is installed relative to the toolbar. As will be described below, a portion of the wheel assembly may include suitable engagement structure (e.g., a rail cradle) for engaging the slide rail, such as by configuring the engagement structure to define a complementary profile or shape to that of the slide rail to permit the rail to be nested within or seated flush against the engagement structure when the wheel assembly is coupled to the toolbar. As a result, the engagement interface provided between the slide rail and the engagement structure may serve to prevent rotation or spinning of the wheel assembly about the toolbar, thereby maintaining the desired circumferential orientation of the wheel assembly relative to the toolbar.

Referring now to FIG. 1, a perspective view of one embodiment of a multi-wing agricultural implement 10 is illustrated in accordance with aspects of the present subject matter. As shown, the implement 10 is configured as a multi-wing planter. However, in other embodiments, the implement 10 may have any other suitable implement configuration, such as by being configured as any other suitable multi-wing implement (e.g., a tiller, seeder, sprayer, fertilizer, and/or the like).

As shown in FIG. 1, the implement 10 includes a laterally extending toolbar or frame assembly 12 connected at its middle to a forwardly extending tow bar 14 to allow the implement 10 to be towed by a work vehicle (not shown), such as an agricultural tractor, in a direction of travel (e.g., as indicated by arrow 16). The frame assembly 12 may generally be configured to support a plurality of seed planting units or row units 18. As is generally understood, each row unit 18 may have at least one ground-engaging tool (e.g., one or more reside managers, opener discs, closing discs, gauge wheels, press wheels, and/or the like) configured to allow seeds (e.g., stored in one or more hoppers or seed tanks (not shown) supported on the frame assembly 12) to be deposited at a desired depth beneath the soil surface and at a desired seed spacing as the implement 10 is being towed by the work vehicle, thereby establishing rows of planted seeds. Additionally, one or more fluid tanks (not shown) may be supported on the frame assembly 12 that stores agricultural fluids, such as insecticides, herbicides, fungicides, fertilizers, and/or the like.

It should be appreciated that, for purposes of illustration, only a portion of the row units 18 of the implement 10 (e.g., two row units along the left side of the frame assembly 12) have been shown in FIG. 1. In general, the implement 10 may include any number of row units 18, such as 6, 8, 12, 16, 24, 32, or 36 row units. In addition, it should be appreciated that the lateral spacing between row units 18 may be selected, for example, based on the type of crop being planted. For instance, the row units 18 may be spaced approximately thirty-six inches from one another for planting cotton, and approximately fifteen inches from one another for planting soybeans.

Further, as shown in FIG. 1, the implement 10 is configured as a multi-wing implement including a plurality of toolbars, frame sections, and/or the like forming at least a portion of the implement's frame assembly 12. Specifically, in the illustrated embodiment, the frame assembly 12 includes a central toolbar 20 and first and second wing toolbars 22, 24 coupled to the central toolbar 20. In one embodiment, the first and second wing toolbars 22, 24 may be configured to be pivotable relative to the central toolbar 20 in a manner that permits such wing toolbars 22, 24 (and any tools coupled thereto, including the row units 18) to be folded (e.g., forward) to reduce the lateral width of the implement 10, such as during storage or transportation of the implement 10 on a road.

Each toolbar 20, 22, 24 may generally be configured to support one or more of the implement's row units 18. For instance, in one embodiment, the row units 18 may be configured to be coupled to a plurality of row unit frame sections (e.g., a central frame section 26 and first and second wing frame sections 28, 30), with each frame section 26, 28, 30 being, in turn, pivotably coupled to a respective toolbar 20, 22, 24. In such an embodiment, suitable actuators 32 (e.g., hydraulic cylinders) may be coupled between each frame section 26, 28, 30 and its respective toolbar 20, 22, 24 to allow the frame section to be automatically pivoted relative to the adjacent toolbar, thereby allowing the row units 18 supported thereby to be raised and lowered relative to the ground (and/or to adjust the downforce applied on the row units 18).

Additionally, one or more wing wheel assemblies 34, 36 may be coupled to each wing toolbar 22, 24 for supporting the wing toolbars 22, 24 (and any tools coupled thereto, including the row units 18) relative to the ground. Specifically, in the illustrated embodiment, a first wing wheel assembly 34 is coupled to the first wing toolbar 22 and a second wing wheel assembly 36 is coupled to the second wing toolbar 24. However, in other embodiments, two or more wing wheel assemblies may be coupled to each wing toolbar 22, 24. As will be described in greater detail below, each wing wheel assembly 34, 36 and its respective wing toolbar 22, 24 may, in several embodiments, form part of a system for adjusting the lateral positioning of wheel assemblies of an agricultural implement. For instance, the system may allow for each wing wheel assembly 34, 36 to be removably or slidably coupled to its respective wing toolbar 22, 24 in a manner that permits the lateral positioning of the wing wheel assembly to be adjusted along the length of the toolbar. Such adjustability of the lateral positioning of the wing wheel assemblies 34, 36 may allow for greater flexibility in varying the lateral spacing between the row units 18. For instance, the operator may be allowed to select a desired lateral spacing between the row units 18, and then can adjust the lateral positioning of each wing wheel assembly 34, 36 along the length of its respective toolbar 22, 24 to accommodate the selected row unit spacing.

It should be appreciated that the configuration of the implement 10 described above and shown in FIG. 1 is provided only to place the present subject matter in an exemplary field of use. In this regard, it should be apparent to those of ordinary skill in the art that the present subject matter may be readily adaptable to any manner of implement configuration.

Figure 2:
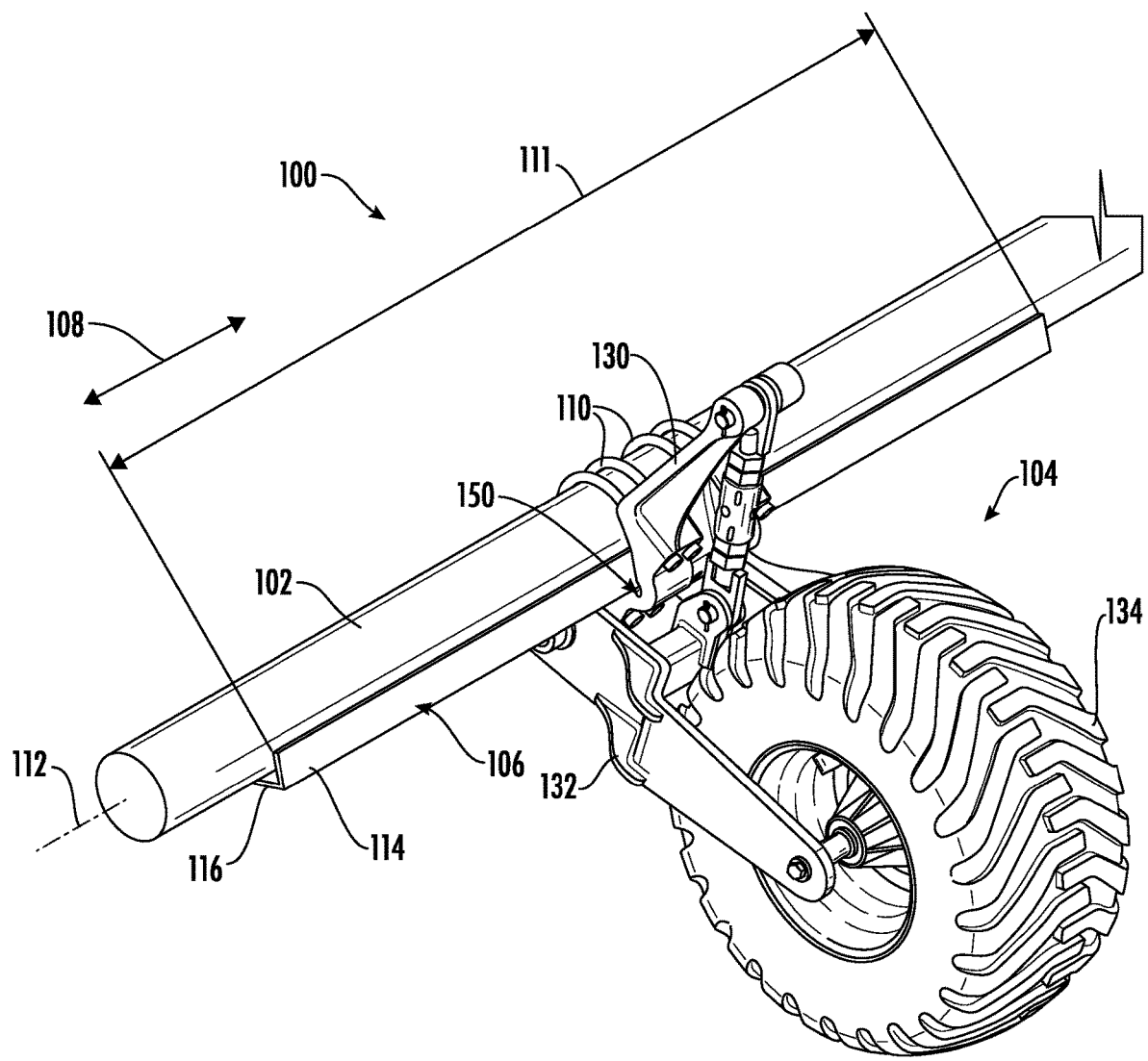
FIG. 2 illustrates a perspective, assembled view of one embodiment of a system for adjusting the lateral positioning of a wheel assembly of an agricultural implement in accordance with aspects of the present subject matter, particularly illustrating a portion of a toolbar along which the lateral positioning of the wheel assembly is adjustable.
Figure 3:
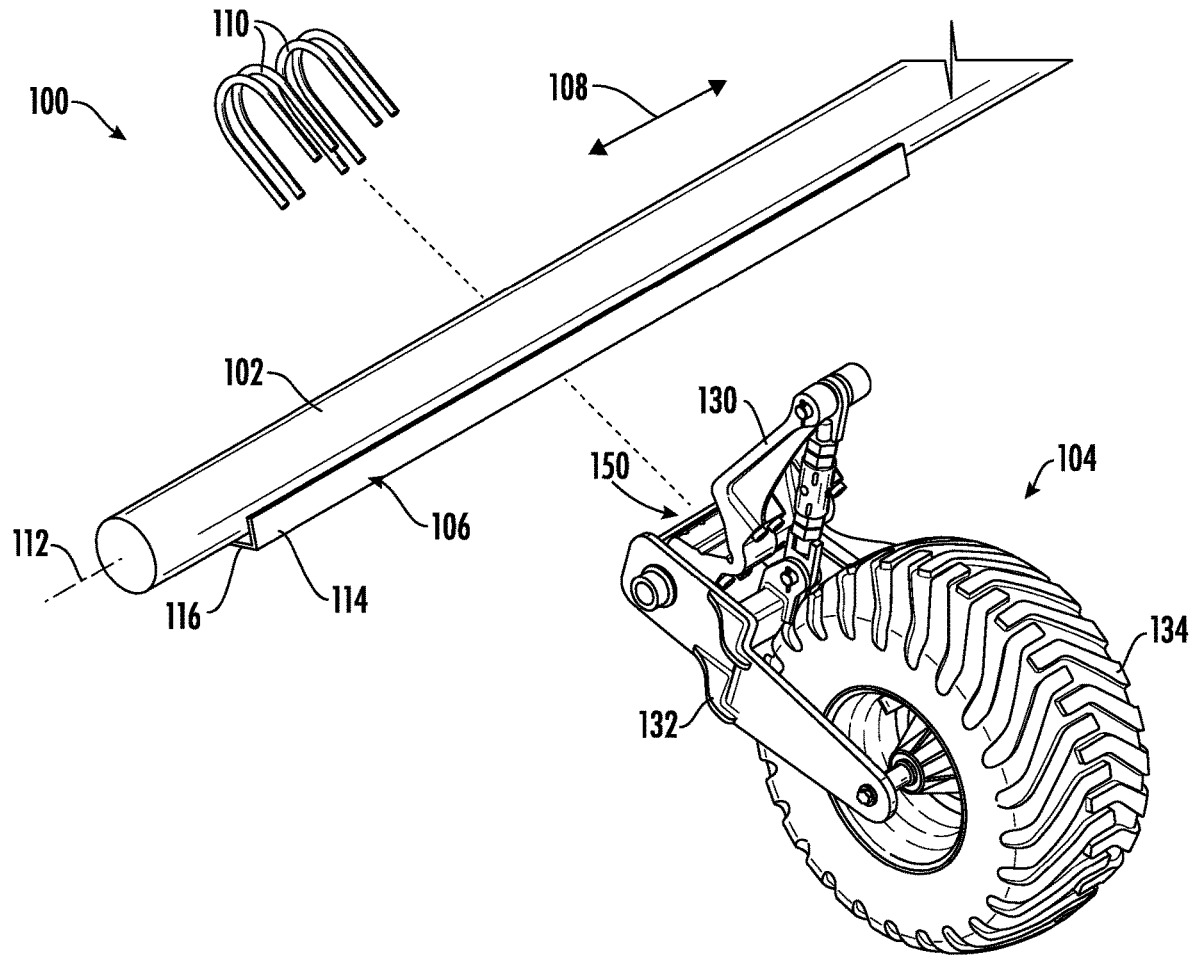
FIG. 3 illustrates a perspective, partially exploded view of the system components shown in FIG. 2.
Figure 4:
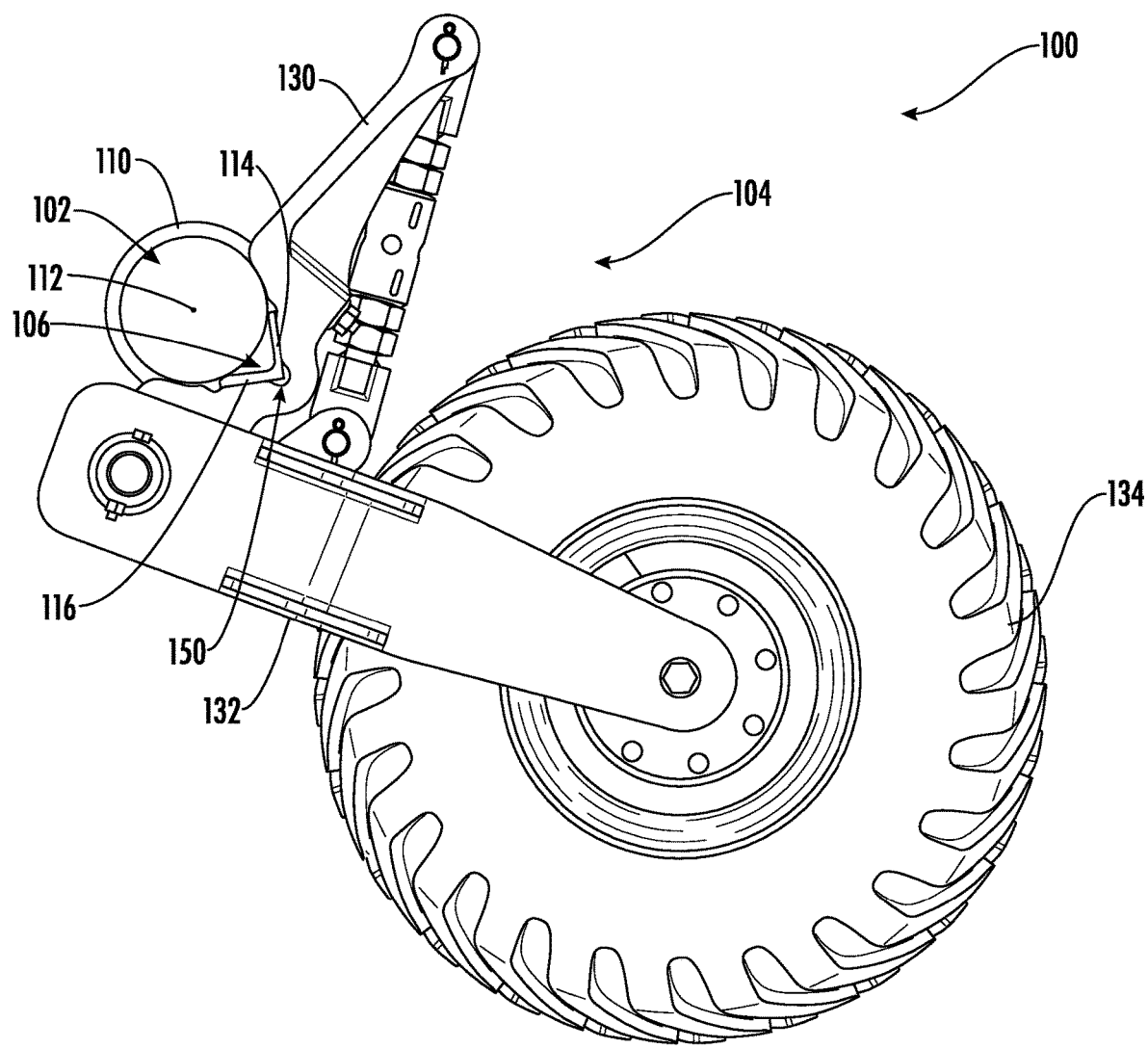
FIG. 4 illustrates a side view of the assembled system components shown in FIG. 2.

Referring now to FIGS. 2-4, differing views of one embodiment of a system 100 for adjusting the lateral positioning of a wheel assembly of an agricultural implement is illustrated in accordance with aspects of the present subject matter. Specifically, FIG. 2 illustrates a perspective, assembled view of one embodiment of suitable components for use within the system 100, while FIG. 3 illustrates a perspective, partially exploded view of the system components shown in FIG. 2. Additionally, FIG. 4 illustrates an end or lateral side view of the assembled system components shown in FIG. 2.

As shown in the illustrated embodiment, the system 100 includes both a toolbar 102 (only a portion of which is shown in FIGS. 2 and 4) configured to support a plurality of components of an associated implement and a wheel assembly 104 configured to be coupled to the toolbar 102 to support the toolbar 102 (and any components coupled thereto) relative to the ground. Although the illustrated embodiment depicts a single wheel assembly 104, it should be appreciated that the system 100 may include two or more wheel assemblies 104 configured to be coupled to the toolbar 102. In several embodiments, the wing wheel assembly 104 may correspond to one of the wing wheel assemblies 34, 36 of the agricultural implement 10 described above with reference to FIG. 1 and the toolbar 102 may correspond to the respective wing toolbar (e.g., the first or second wing toolbar 22, 24) to which the wing wheel assembly 36, 36 is coupled. In such an embodiment, the toolbar 102 may, for example, be configured to support a plurality of row units 18 and related components of the implement 10. However, in other embodiments, the wheel assembly 104 and related toolbar 102 may form components of any other suitable agricultural implement. Thus, it should be appreciated that aspects of the disclosed system 100 may be used to allow for adjustments of the lateral positioning of any suitable wheel assembly of an agricultural implement relative to an adjacent toolbar of such implement.

Additionally, as shown in FIGS. 2-4, the system 100 may also include a laterally extending slide rail 106 (often referred to herein simply as a "rail") coupled to the toolbar 102 (e.g., via welding or fasteners) such that the rail 106 is positioned between the toolbar 102 and a corresponding portion of the wheel assembly 104 when such assembly 104 is installed relative to the toolbar 102. Although the illustrated embodiment depicts a single slide rail 106, it should be appreciated that the system 100 may include two or more slide rails 106 coupled to the toolbar 102 (e.g., in an embodiment in which the system 100 includes two or more wheel assemblies 104). In accordance with aspects of the present subject matter, the wheel assembly 104 may be configured to be moved or slid along the length of the rail 106 in the lateral direction (indicated by arrow 108) to adjust the lateral positioning of the wheel assembly 104 relative to the toolbar 102. For instance, in several embodiments, the wheel assembly 104 may be configured to be removably coupled to the toolbar 102 using suitable mechanical fasteners (e.g., the U-bolts 110 shown in FIG. 3 and related hardware (not shown), such as washers/nuts). In such an embodiment, when the mechanical fasteners 110 are loosened sufficiently, the wheel assembly 104 may be moved or slid in the lateral direction 108 along the length of the rail 106 until the desired lateral positioning is achieved, at which point the mechanical fasteners 110 may be re-tightened to fix the position of the wheel assembly 104 relative to the toolbar 102.

It should be appreciated that the slide rail 106 may generally be configured to extend laterally along the toolbar 102 any suitable length 111. For instance, in one embodiment, the length 111 of the rail 106 may be selected to allow for adjustability of the position of the wheel assembly 104 relative to the toolbar 102 across a wide range of lateral positions, thereby permitting, for example, the lateral spacing of the row units supported on the associated implement to be varied or adjusted, as desired, across a corresponding spacing range.

Figure 5:
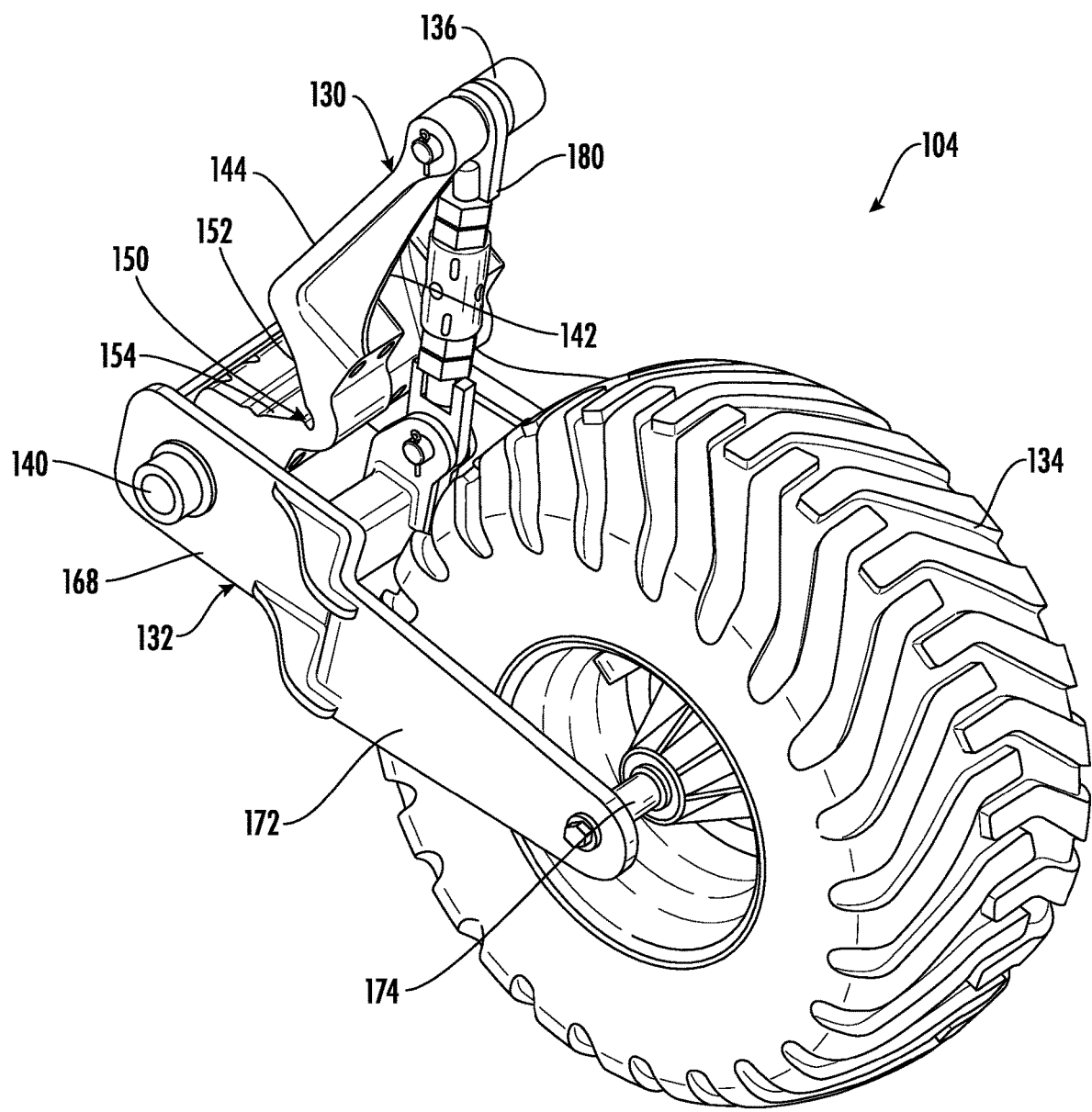
FIG. 5 illustrates a front perspective view of one embodiment of a wheel assembly suitable for use within at least one embodiment of a system for adjusting the lateral positioning of a wheel assembly of an agricultural implement in accordance with aspects of the present subject matter.
Figure 6:
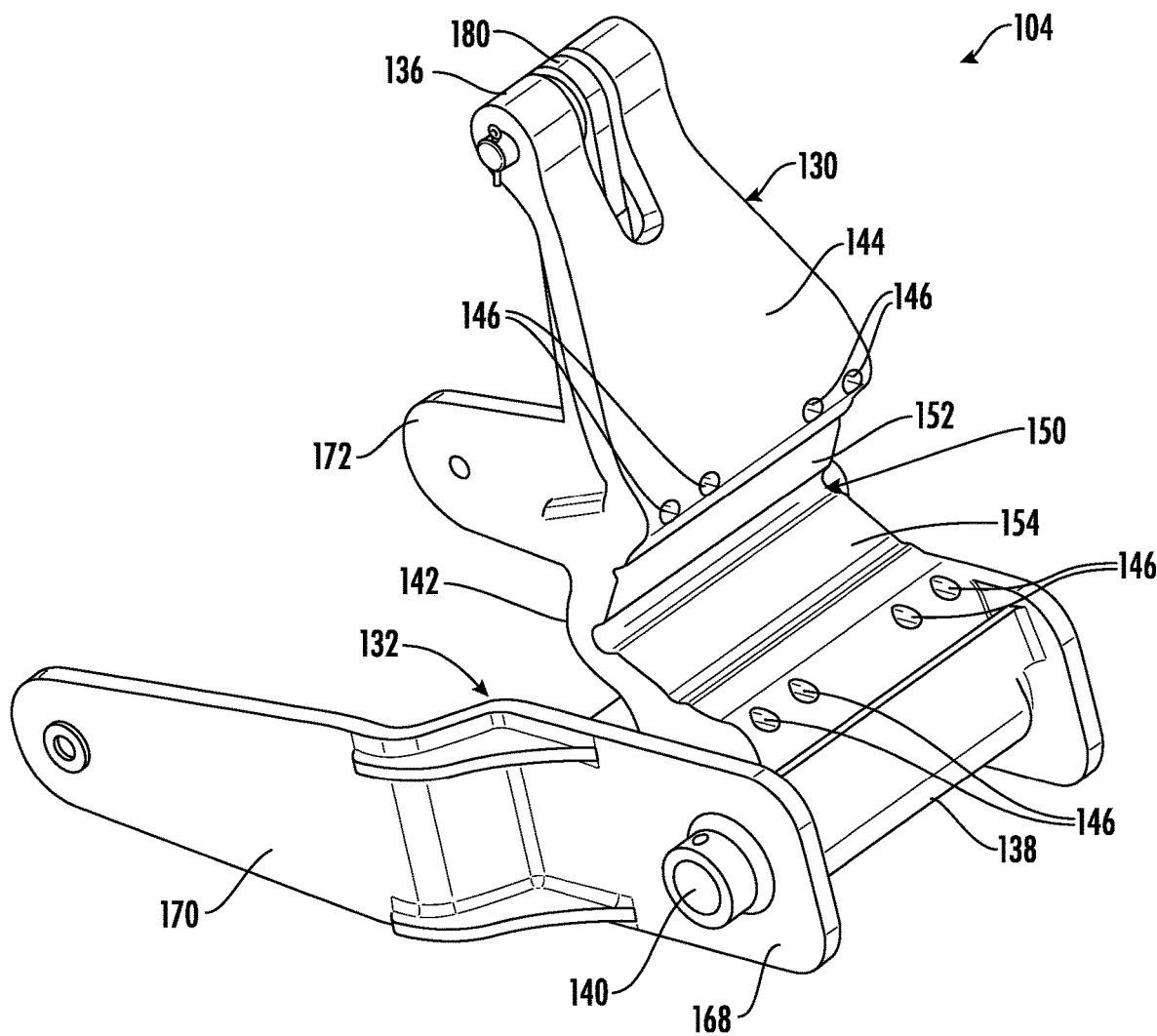
FIG. 6 illustrates a rear perspective view of the wheel assembly shown in FIG. 5 with the associated wheel removed for purposes of illustration.
Figure 7:
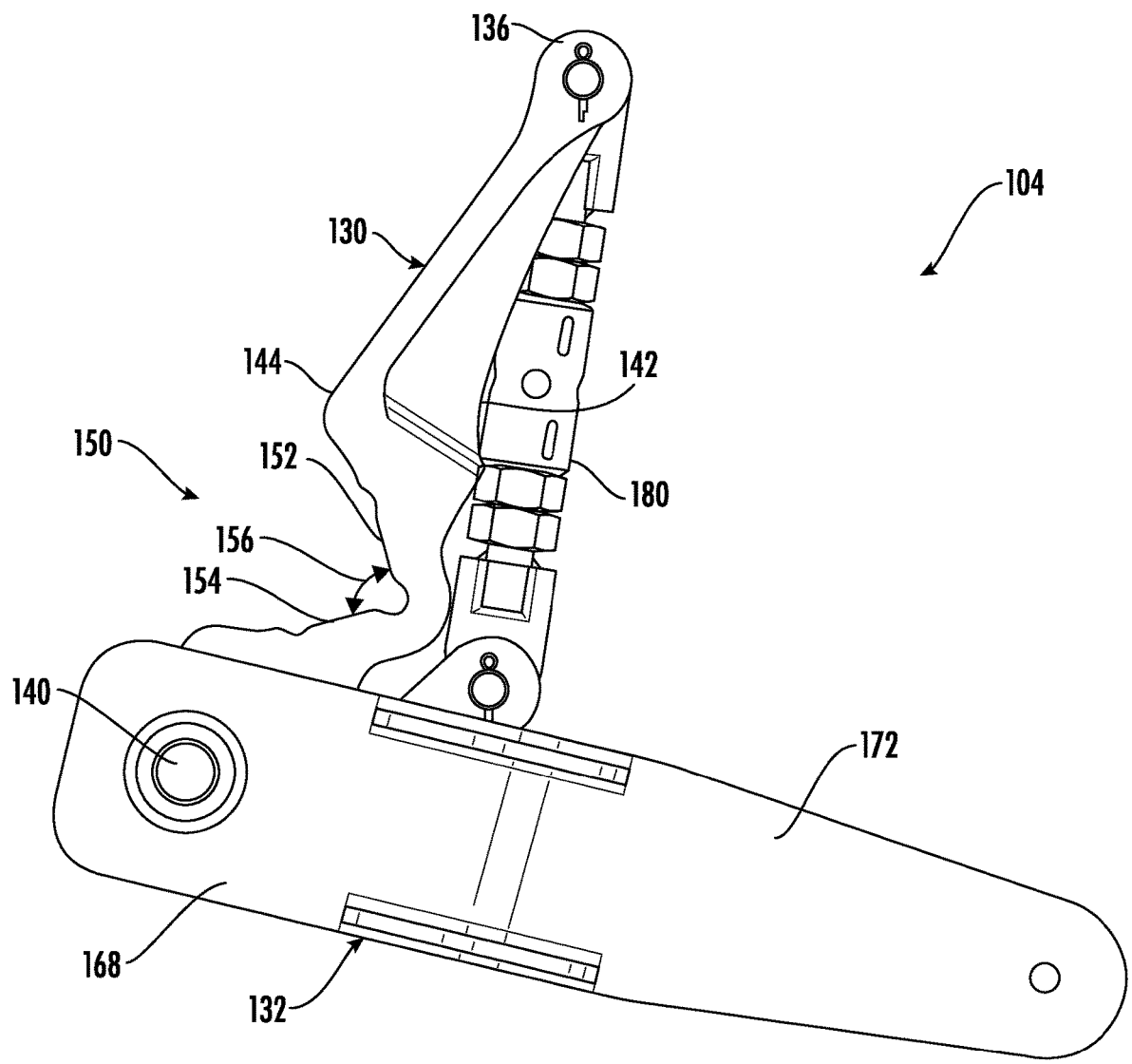
FIG. 7 illustrates a side view of the portion of the wheel assembly shown in FIG. 6.

As shown in FIGS. 2-4, in several embodiments, the toolbar 102 may be configured as a tubular-like frame member having a substantially circular cross-sectional profile. For example, as particularly shown in the side or end view of FIG. 4, the toolbar 102 defines a substantially circular-shaped profile having a generally constant radius of curvature centered about a laterally extending central axis 112 of the toolbar 102. In such an embodiment, to facilitate maintaining the circumferential orientation or positioning of the wheel assembly 104 on the toolbar 102 despite the toolbar's circular shape, the rail 106 may be configured to function as an anti-rotation feature that prevents rotation of the wheel assembly 104 relative to the toolbar 102. Specifically, as will be described below, the rail 106 may have a suitable shape or profile that mates with, matches and/or is otherwise configured to engage corresponding engagement structure of the wheel assembly 104 (e.g., a rail cradle), thereby preventing rotation of the wheel assembly 104 about the central axis 112 and, thus, fixing the circumferential orientation or positioning of the wheel assembly 104 relative to the toolbar 102. For instance, as shown in the illustrated embodiment, the rail 106 is configured as an elongated member having first and second rail walls 114, 116 oriented at a given rail angle relative to one another, such as by forming the rail 106 using a suitable length of angle iron. However, in other embodiments, the rail 106 may have any other suitable configuration and/or shape, including any number and/or configuration of rail walls, Referring now to FIGS. 5-7, differing views of one embodiment of a wheel assembly 104 suitable for use within the disclosed system 100 is illustrated in accordance with aspects of the present subject matter. Specifically, FIG. 5 illustrates a forward perspective view of the wheel assembly 104, while FIG. 6 illustrates an aft perspective view of the wheel assembly 104 with the associated wheel removed for purposes of illustration. Additionally, FIG. 7 illustrates a side view of the wheel assembly 104 shown in FIG. 6. It should be appreciated that, although the wheel assembly 104 shown in FIGS. 5-7 will generally be described herein with reference to a wing wheel assembly, such as one of the wing wheel assemblies 34, 36 described above with dereference to FIG. 1, the wheel assembly 104 may generally correspond to any suitable wheel assembly configured for use with an agricultural implement.

As shown in the illustrated embodiment, the wheel assembly 104 generally includes a main wheel frame 130, a forked wheel arm 132 pivotably coupled to the wheel frame 130, and a wheel 134 rotationally supported by the wheel arm 132. The wheel frame 130 may generally be configured to be removably coupled to the adjacent substantially circular-shaped toolbar 102 (FIGS. 2-4) of the associated system 100 to allow the wheel 134 to be supported relative to the toolbar 102 for rotation along the ground. For instance, as indicated above, the connection or coupling provided between the toolbar 102 and the wheel assembly 104 (e.g., via the wheel frame 130) may permit the wheel assembly 104 to be moved or slid laterally along the toolbar 102 (e.g., along the length of the associated slide rail 106 (FIGS. 2-4)) to adjust the relative lateral position thereof, while still allowing the wheel assembly 104 to be non-rotatably secured to the toolbar 102 (e.g., via circumferential engagement with the rail 106) for preventing rotation of the assembly 104 relative to the toolbar 102 during operation.

As shown in the illustrated embodiment, the wheel frame 130 generally extends lengthwise between an upper end 136 and a lower end 138, with the lower end 138 of the wheel frame 130 configured to be pivotably coupled to a portion of the wheel arm 132 (e.g., at pivot point 140). Additionally, the wheel frame 130 extends in the fore-to-aft direction between a forward or first side 142 of the wheel frame 130 and an opposed aft or second side 144 of the wheel frame 130, with the forward side 142 of the wheel frame 130 being generally configured to face towards the wheel 134 of the wheel assembly 104. In one embodiment, suitable mounting features may be defined between the forward and aft sides 142, 144 of the wheel frame 130 to facilitate mounting or coupling the wheel frame 130 to the toolbar 102. For instance, as particularly shown in FIG. 7, upper and lower sets of bolt-holes 146 are defined through the wheel frame 130 for receiving the mechanical fasteners used to couple the wheel frame 130 to the toolbar 102, such as portions of the U-bolts 110 described above with reference to FIGS. 2-4.

As shown in the illustrated embodiment, the wheel frame 130 may generally be configured such that a rail cradle 150 is defined along the second or aft side 144 of the frame 130. In general, the rail cradle 150 may be shaped or otherwise configured to allow the wheel frame 130 to engage the associated anti-rotation feature of the disclosed system 100 (e.g., the slide rail 106). For instance, in the illustrated embodiment, the rail cradle 150 is formed by first and second engagement surfaces 152, 154 oriented relative to each other such that an engagement angle 156 (FIG. 7) is defined between the engagement surfaces 152, 154. Specifically, as shown in FIG. 7, the first and second engagement surfaces 152, 154 are generally oriented perpendicularly relative to each other such that the rail cradle 150 defines a substantially right angle (i.e., the engagement angle 156 is equal to approximately 90 degrees, such as by ranging from about 85 degrees to about 95 degrees or from about 88 degrees to about 92 degrees or from about 89 degrees to about 91 degrees and/or any other subranges therebetween). In such an embodiment, the slide rail 106 may generally be configured to define a matching profile or shape so that, when the wheel assembly 104 is mounted to the toolbar 102, the engagement surfaces 152, 154 of the wheel frame 130 mate or otherwise circumferentially engage with the rail 106, thereby preventing rotation of the wheel assembly 104 relative to the toolbar. For example, referring briefly back to FIG. 4, the first and second rail walls 114, 116 of the slide rail 106 are generally oriented at a substantially right angle relative to each other, thereby allowing the rail 106 to nest within the rail cradle 150 formed by the wheel frame 130. Thus, when the wheel assembly 104 is coupled to the toolbar 102, the first rail wall 114 may generally be seated flush against and/or may otherwise engage/contact the first engagement surface 152 of the rail cradle 150, while the second rail wall 116 may generally be seated flush against and/or may otherwise engage/contact the second engagement surface 154 of the rail cradle 150, thereby preventing rotation of the wheel assembly 104 about the substantially circular-shaped toolbar 102.

Referring back to FIGS. 5-7, it should be appreciated that, in other embodiments, the rail engagement angle 156 defined between the engagement surfaces 152, 154 of the rail cradle 150 may correspond to any other suitable angle (e.g., such as by being greater than approximately 90 degrees or less than approximately 90 degrees), depending on, for example, the configuration of the slide rail 106 and/or the desired manner of engagement between the wheel frame 130 and the rail 106. For instance, in an embodiment in which the walls 114, 116 of the slide rail 106 are oriented relative to each other at a more acute angle (e.g., a 60 degree angle), the rail cradle 150 may be shaped or otherwise configured such that the engagement surfaces 152, 154 are oriented relative to each other at a corresponding or complementary angle (e.g., a 60 degree angle). Additionally, it should be appreciated that, although the first and second engagement surfaces 152, 154 are generally shown as flat or planar surfaces, such surfaces 152, 154 may generally have any suitable profile or shape, again depending on, for example, the configuration of the associated slide rail 106 and/or the desired manner of engagement between the wheel frame 130 and the rail 106. For instance, in an alternative embodiment, the first and second engagement surfaces 152, 154 may have an arcuate profile or may otherwise be configured as curved or non-planar surfaces.

In even further embodiments, the engagement profile or interface defined between the rail cradle 150 and the slide rail 106 may have any other suitable shape and/or configuration that generally permits the rail 106 to function as an anti-rotation feature within the disclosed system 100. For instance, in one embodiment, the rail 106 may be configured as a three-side rectangular tube or plate coupled to the toolbar 102 at a suitable location around its outer circumference. In such an embodiment, the rail cradle 150 formed by the wheel frame 130 may be configured to define a complementary shape or profile for engaging the rectangular-shaped rail, such as by configuring the rail cradle 150 to define a three-walled channel or recess within which the rail is received when the wheel assembly 104 is installed relative to the toolbar 102. In another embodiment, the rail 106 may be configured as an arcuate rail having a radius of curvature that differs from the radius of curvature of the toolbar 102 (e.g., by having a radius of curvature that is smaller than the radius of curvature of the toolbar 102). In such an embodiment, the rail cradle 150 may be configured to define a complementary curved/arced shape or profile for engaging the arcuate rail, such as by configuring the rail cradle 150 to define a continuous engagement surface having a curved profile that is complementary to the radius of curvature of the rail 106 to allow the rail 106 to nest within or otherwise circumferentially engage the rail cradle 150. In an even further embodiment, the rail 106 may be configured as a flat plate coupled to the toolbar 102 so that the rail 106 extends, for example, tangential to the outer circumferential surface of the toolbar 102. In such an embodiment, the rail cradle 150 may be configured to define a suitable profile for engaging the tangentially extending plate-like rail 106, such as by configuring the rail cradle 150 to define channels or slots for receiving the opposed sides of the rail 106 extending outwardly from the toolbar 102.

Referring still to FIGS. 5-7, as indicated above, the wheel assembly 104 may also include a forked wheel arm 132. In general, the wheel arm 132 may be configured to support the associated wheel 134 of the wheel assembly 104 for rotation relative thereto. For instance, as particularly shown in FIG. 6, the wheel arm 132 includes an arm base 168 configured to be pivotably coupled to the lower end 138 of the wheel frame 130 (e.g., at pivot point 140). In addition, the wheel arm 132 includes first and second arm portions 170, 172 projecting outwardly away from the arm base 168 such that the arm portions 170, 172 extend along opposed sides of the wheel 134 for supporting a corresponding axle shaft 174 (FIG. 5) about which the wheel 134 is configured to rotate.

Additionally, in several embodiments, the wheel assembly 104 may also include an actuator 180 coupled between the wheel frame 130 and the wheel arm 132 for adjusting the position of the wheel 134 relative to the toolbar 102 when the wheel assembly 104 is installed thereon. For instance, as shown in FIG. 5, the actuator 180 is coupled between the upper end 136 of the wheel frame 130 and the arm base 168 of the wheel arm 130 such that extension/retraction of the actuator 180 results in pivoting of the wheel arm 132 relative to the wheel frame 130 about the pivot point 140 defined between such components. It should be appreciated that, in one embodiment, the actuator 180 may correspond to a manually operated actuator 180, such as a turnbuckle. Alternatively, the actuator 180 may correspond to a fluid-driven actuator (e.g., a hydraulic or pneumatic cylinder) or a solenoid-operated actuator.

It should be appreciated that, as indicated above, the disclosed wheel assembly 104 may generally provide numerous advantages when installed on an associated toolbar 102 of an agricultural implement. Specifically, by loosening the mechanical fasteners used to couple the wheel frame 130 to the toolbar 102, the entire wheel assembly 104 may be slid or moved along the length of the rail 106 to adjust the lateral positioning of the wheel assembly 104 relative to the toolbar 102. The ability to adjust the lateral positioning of the wheel assembly 104 may, for example, be particularly advantageous for use with planters in which it is desirable to adjust the lateral spacing between adjacent row units 18. In such instance, the wheel assembly 104 may be quickly and easily moved laterally along the length of the toolbar 102, as needed, to accommodate the desired row unit spacing. Moreover, by configuring the system 100 to include an anti-rotation feature, such as the slide rail 106, the wheel assembly 104 may be coupled to the substantially circular-shaped toolbar 102 without rotation or circumferential slipping of the wheel assembly 104 relative to the toolbar 102 during operation of the associated implement.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they include structural elements that do not differ from the literal language of the claims, or if they include equivalent structural elements with insubstantial differences from the literal languages of the claims.

What is claimed is:

1. A system for adjusting the lateral positioning of wheel assemblies of agricultural implements, the system comprising:
    a toolbar extending in a lateral direction and having a substantially circular cross-sectional shape;
    a rail coupled to the toolbar and extending in the lateral direction along a length of the toolbar; and
    a wheel assembly configured to be removably coupled to the toolbar such that the rail is positioned between the toolbar and a portion of the wheel assembly, the wheel assembly including engagement structure configured to engage the rail when the wheel assembly is installed relative to the toolbar;
    wherein the engagement between the rail and the engagement structure of the wheel assembly is configured to prevent rotation of the wheel assembly relative to the toolbar.

2. The system of claim 1, wherein the wheel assembly comprises a wheel frame configured to be removably coupled to the toolbar, the engagement structure comprising a rail cradle defined by a portion of the wheel frame.

3. The system of claim 2, wherein the rail cradle defines a shape or profile that is complementary to a corresponding shape or profile defined by the rail such that the wheel frame circumferentially engages the rail when the wheel assembly is installed relative to the toolbar.

4. The system of claim 3, wherein the rail cradle includes at least one engagement surface configured to circumferentially engage at least one adjacent rail wall of the rail when the wheel assembly is installed relative to the toolbar.

5. The system of claim 4, wherein the at least one engagement surface comprises a first engagement surface and a second engagement surface oriented relative to the first engagement surface such that the rail cradle defines a rail engagement angle between the first and second engagement surfaces.

6. The system of claim 5, wherein the at least one adjacent rail wall of the rail comprises a first rail wall and a second rail wall oriented relative to the first rail wall at an angle that is complementary to the rail engagement angle of the rail cradle.

7. The system of claim 6, wherein rail engagement angle is approximately 90 degrees.

8. The system of claim 2, wherein the wheel assembly further comprises a forked wheel arm pivotably coupled to the wheel frame and a wheel rotationally supported by the forked wheel arm.

9. The system of claim 8, wherein the wheel assembly further comprises an actuator coupled between the wheel frame and the forked wheel arm.

10. The system of claim 1, wherein the wheel assembly is removably coupled to the toolbar via mechanical fasteners such that, when the mechanical fasteners are loosened, the wheel assembly is slidable along the rail to adjust a lateral position of the wheel assembly relative to the toolbar.

11. A multi-wing agricultural implement, comprising:
a frame assembly comprising a plurality of laterally extending toolbars, the plurality of laterally extending toolbars comprising a central toolbar, a first wing toolbar positioned on one side of the central toolbar along a lateral direction of the frame assembly and a second wing toolbar positioned on the opposed side of the central toolbar along the lateral direction, the first wing toolbar defining a substantially circular cross-sectional shape;
a rail coupled to the first wing toolbar and extending in the lateral direction along a length of the first wing toolbar; and
a wheel assembly configured to be removably coupled to the first wing toolbar such that the rail is positioned between the first wing toolbar and a portion of the wheel assembly, the wheel assembly including engagement structure configured to engage the rail when the wheel assembly is installed relative to the first wing toolbar;
wherein the engagement between the rail and the engagement structure of the wheel assembly is configured to prevent rotation of the wheel assembly relative to the first wing toolbar.

12. The multi-wing agricultural implement of claim 11, wherein the wheel assembly comprises a wheel frame configured to be removably coupled to the first wing toolbar, the engagement structure comprising a rail cradle defined by a portion of the wheel frame.

13. The multi-wing agricultural implement of claim 12, wherein the rail cradle defines a shape or profile that is complementary to a corresponding shape or profile defined by the rail such that the wheel frame circumferentially engages the rail when the wheel assembly is installed relative to the first wing toolbar.

14. The multi-wing agricultural implement of claim 13, wherein the rail cradle includes at least one engagement surface configured to circumferentially engage at least one adjacent rail wall of the rail when the wheel assembly is installed relative to the first wing toolbar.

15. The multi-wing agricultural implement of claim 14, wherein the at least one engagement surface comprises a first engagement surface and a second engagement surface oriented relative to the first engagement surface such that the rail cradle defines a rail engagement angle between the first and second engagement surfaces, and wherein the at least one adjacent rail wall of the rail comprises a first rail wall and a second rail wall oriented relative to the first rail wall at an angle that is complementary to the rail engagement angle of the rail cradle.

16. The multi-wing agricultural implement of claim 15, wherein rail engagement angle is approximately 90 degrees.

17. The multi-wing agricultural implement of claim 12, wherein the wheel assembly further comprises a forked wheel arm pivotably coupled to the wheel frame and a wheel rotationally supported by the forked wheel arm.

18. The multi-wing agricultural implement of claim 17, wherein the wheel assembly further comprises an actuator coupled between the wheel frame and the forked wheel arm.

19. The multi-wing agricultural implement of claim 11, wherein the second wing toolbar defines a substantially circular cross-sectional shape, the implement further comprising:
a second rail coupled to the second wing toolbar and extending in the lateral direction along a length of the second wing toolbar; and
a second wheel assembly configured to be removably coupled to the second wing toolbar such that the second rail is positioned between the second wing toolbar and a portion of the second wheel assembly, the second wheel assembly including engagement structure configured to engage the second rail when the second wheel assembly is installed relative to the second wing toolbar;
wherein the engagement between the rail and the engagement structure of the second wheel assembly is configured to prevent rotation of the second wheel assembly relative to the second wing toolbar.

20. The multi-wing agricultural implement of claim 11, wherein the multi-wing implement comprises a multi-wing planter and the plurality of laterally extending toolbars are configured to support a plurality of laterally spaced row units.

* * * * *